(No Model.)
M. LENNON.
PORTABLE GRINDING APPARATUS.
No. 287,447. Patented Oct. 30, 1883.
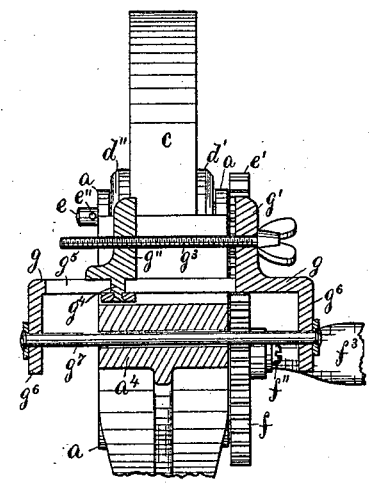
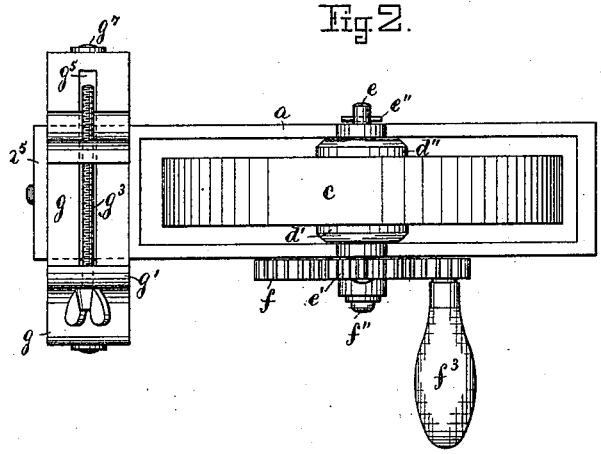
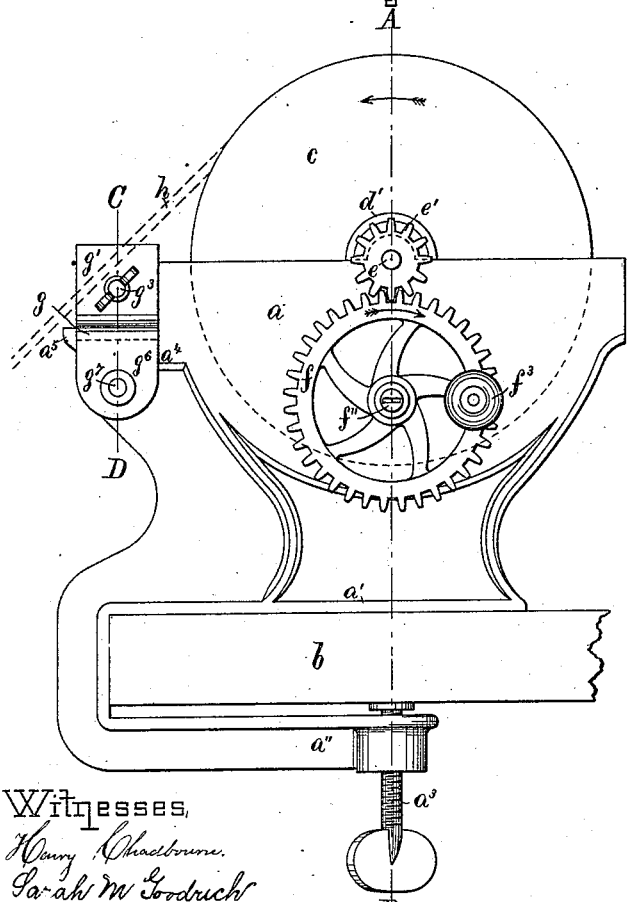
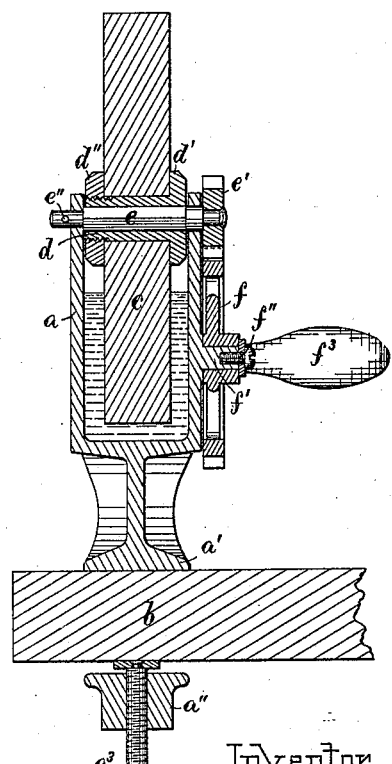
Witnesses,
Henry Chadbourne.
Sarah M. Goodrich.
Inventor
Michael Lennon
by Albay Andrew his atty

UNITED STATES PATENT OFFICE.

MICHAEL LENNON, OF SOMERVILLE, MASSACHUSETTS.

PORTABLE GRINDING APPARATUS.

SPECIFICATION forming part of Letters Patent No. 287,447, dated October 30, 1883.

Application filed August 24, 1883. (No model.)

*To all whom it may concern:*

Be it known that I, MICHAEL LENNON, a citizen of the United States, residing at Somerville, in the county of Middlesex and State of Massachusetts, have invented certain new and useful Improvements in Portable Grinding Apparatus; and I do hereby declare that the same are fully described in the following specification and illustrated in the accompanying drawings.

This invention relates to improvements in portable grinding apparatus, and it is carried out as follows, reference being had to the accompanying drawings, where—

Figure 1 represents a side elevation of the invention, and Fig. 2 represents a plan view. Fig. 3 represents a cross-section on the line A B, (shown in Fig. 1;) and Fig. 4 represents a cross-section on the line C D, (also shown in Fig. 1.)

Similar letters refer to similar parts wherever they occur on the different parts of the drawings.

$a$ is the metal trough for containing water, as is usual in grinding apparatus. In one piece with the trough $a$ is cast the lower forked clamping-piece, $a'$ $a''$, adapted to be placed upon a bench or table, $b$, as shown in Fig. 1, and secured temporarily thereto by means of thumb-screw $a^3$, passing through a screw-threaded perforation in the lower portion, $a''$, of the said forked clamping-piece.

$c$ is the grindstone, through a central perforation in which is secured the metal hub $d$, having flange $d'$ on one end and adjustable screw-threaded collar $d''$ on its other end, which collar $d''$ is adjustable upon a screw-threaded part of the hub $d$, so as to secure the stone $c$ firmly upon the hub $d$, between its flange $d'$ and nut or collar $d''$. Through the hub $d$ is made a square hole, into which is inserted the square shaft $e$, the ends of which are cylindrical and made to rotate in bearings in the upper part of the trough $a$, as shown in Fig. 3. To one end of the shaft $e$ is secured the small pinion $e'$, and through a hole in its extreme opposite end is a lateral perforation, through which is inserted a pin, $e''$, by which arrangement the shaft $e$ is prevented from moving longitudinally during its rotation.

$f'$ is a circular projection on the outside of the trough $a$, which projection serves as a spindle on which the gear-wheel $f$ is supported, the latter gearing into the teeth of pinion $e'$, as shown in Figs. 1 and 3.

$f''$ is a screw screwed into a central screw-threaded perforation in the end of projection $f'$, as shown in Fig. 3, so as to retain the wheel $f$ in its proper position on said projection, and to prevent the said wheel from dropping off the projection $f'$ when the apparatus is in use.

$f^3$ is a crank attached to gear-wheel $f$, and adapted for the operator to take hold of to impart a rotary motion to said wheel $f$, the pinion $e'$, and grindstone $c$.

To the forward end of the trough $a$ is cast the bracket $a^4$, that serves as a rest and guide for the laterally-adjustable tool-holder, composed of plate $g$, with its upwardly-projecting stationary jaw $g'$, as shown in Fig. 4. On top of plate $g$ is located the adjustable jaw $g''$, which is adjustable to and from the jaw $g'$ by means of thumb-screw $g^3$, passing through a perforation in jaw $g'$ and screwed through the jaw $g''$, the latter being guided on the plate $g$ by means of the headed bolt $g^4$, that passes through the slot $g^5$ in the plate $g$, as shown.

$g^6$ $g^6$ are downwardly-projecting ears from the plate $g$, to which is secured the guide-rod $g^7$, passing loosely through a perforation in the bracket $a^4$, as shown in Fig. 4.

$a^5$ is a lip in the upper part of bracket $a^4$, and it serves as an outer guide for the plate $g$ when the apparatus is in use.

In using the machine, I secure the tool, $h$, that is to be ground between the jaws $g'$ and $g''$ by tightening the screw $g^3$. By imparting a rotary motion to the crank $f^3$, the grindstone $c$ is set in a rapid rotary motion, during which the tool-holder is moved forward and back with its tool across the face of the grindstone, and in this manner the tool may be sharpened accurately and in a very rapid manner.

What I wish to secure by Letters Patent, and claim, is—

1. In combination with the grindstone $c$, and the trough $a$ and its clamping device $a'$ $a''$ $a^3$, the bracket $a^4$ $a^5$, laterally-adjustable plate $g$, its stationary jaw $g'$, movable jaw $g''$, regulating-screw $g^3$, and ears $g^6$ $g^6$, with guide-pin $g^7$, as and for the purpose set forth.

2. In a grinding apparatus, the herein-described tool-holder, consisting of bracket $a^4$ $a^5$, slotted plate $g$, stationary jaw $g'$, movable jaw $g''$, screw $g^3$, ears $g^6$ $g^6$, and guide-rod $g^7$, passing through perforation in bracket $a^4$, all combined and arranged as set forth.

In testimony whereof I have affixed my signature in presence of two witnesses.

MICHAEL LENNON.

Witnesses:
ALBAN ANDRÉN,
HENRY CHADBOURN.